US009674638B2

(12) United States Patent
Angiolillo et al.

(10) Patent No.: US 9,674,638 B2
(45) Date of Patent: Jun. 6, 2017

(54) DYNAMIC MOBILE DEVICE FEEDBACK METHODS, SYSTEMS, AND APPARATUS

(71) Applicant: VERIZON PATENT AND LICENSING INC., Arlington, VA (US)

(72) Inventors: Joel S. Angiolillo, Weston, MA (US);
Amit Mahajan, Bridgewater, NJ (US);
Hannah Y. Moon, Boston, MA (US);
Dorothy Beau Morley, Wakefield, MA (US); Elizabeth Bersano, Waltham, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 272 days.

(21) Appl. No.: 14/341,050

(22) Filed: Jul. 25, 2014

(65) Prior Publication Data
US 2016/0029145 A1    Jan. 28, 2016

(51) Int. Cl.
*H04M 3/00*    (2006.01)
*H04W 4/00*    (2009.01)
*G06Q 30/02*   (2012.01)
*H04W 24/08*   (2009.01)
*G06Q 30/00*   (2012.01)

(52) U.S. Cl.
CPC .......... *H04W 4/001* (2013.01); *G06Q 30/016* (2013.01); *G06Q 30/0203* (2013.01); *H04W 24/08* (2013.01)

(58) Field of Classification Search
CPC ...................................... H04W 4/001
See application file for complete search history.

(56) References Cited

U.S. PATENT DOCUMENTS

| | | | |
|---|---|---|---|
| 2011/0067044 A1* | 3/2011 | Albo | H04N 7/17318 725/13 |
| 2015/0294451 A1* | 10/2015 | Lee | F25D 29/00 382/110 |
| 2015/0310456 A1* | 10/2015 | Vandenburgh | G06Q 50/20 705/7.32 |
| 2015/0348071 A1* | 12/2015 | Cochrane | G06Q 30/0204 705/7.32 |

* cited by examiner

*Primary Examiner* — Justin Lee

(57) ABSTRACT

A dynamic mobile device feedback system is described. Feedback may be obtained using a device feedback client residing on the mobile device and a feedback server remote to the mobile device. The device feedback client may receive feedback solicitation inquiries (invitations/queries) and presentation rules from the feedback server, monitor the mobile device, identify trigger events associated with the mobile device, present the feedback solicitation inquiries in accordance with the presentation rules, and receive feedback from the user of the mobile device. The feedback may be sent to the feedback server for further processing.

21 Claims, 6 Drawing Sheets

| APP NAME/CONFIG PARAMETER | ACTUAL VALUE | EXPECTED VALUE |
|---|---|---|
| DEVICE PROFILE | | |
| MDN | 5551237373 | N/A |
| MEID | A000000AB34985 | N/A |
| IMSI | 310150123456789 | N/A |
| OS V | JELLY BEAN 4.1 | N/A |
| FIRMWARE V | V6 | N/A |
| NETWORK – DEVICE | 1XEvDO | N/A |
| SIGNAL STRENGTH | 55 | N/A |
| PAIRED – DEVICE | Paired device list | N/A |
| BATTERY STRENGTH | 88 | N/A |
| DEVICE – MEMORY | 53766 | N/A |
| BLUETOOTH STATUS | | |
| STATUS ON/OFF | OFF | OFF |
| BT COMPATIBLE IN AREA | TRUE | N/A |
| BT DEVICE 1 | HEADSET | N/A |
| GPS – LOC | | |
| GPS SIGNAL STRENGTH | 43 | N/A |
| ERROR RADIUS | 65 | N/A |
| WI-FI | | |
| STATUS ON/OFF | ON | OFF |
| WI-FI SIGNAL STRENGTH | 67 | N/A |
| WI-FI MAC ADDRESS | 00:A0:C9:13:C8:27 | N/A |
| WI-FI COMPATIBLE IN AREA | TRUE | N/A |
| WI-FI DEVICE 1 | C9 LAPTOP | N/A |
| WI-FI DEVICE 2 | A-BELS TABLET | N/A |
| NETWORK STATE | | |
| CONFIG. APN PARAMETERS | 16 | N/A |
| ENBL/DBL GLOBAL MODE | EN | DS |
| TURN OFF LTE RADIO | OFF | ON |

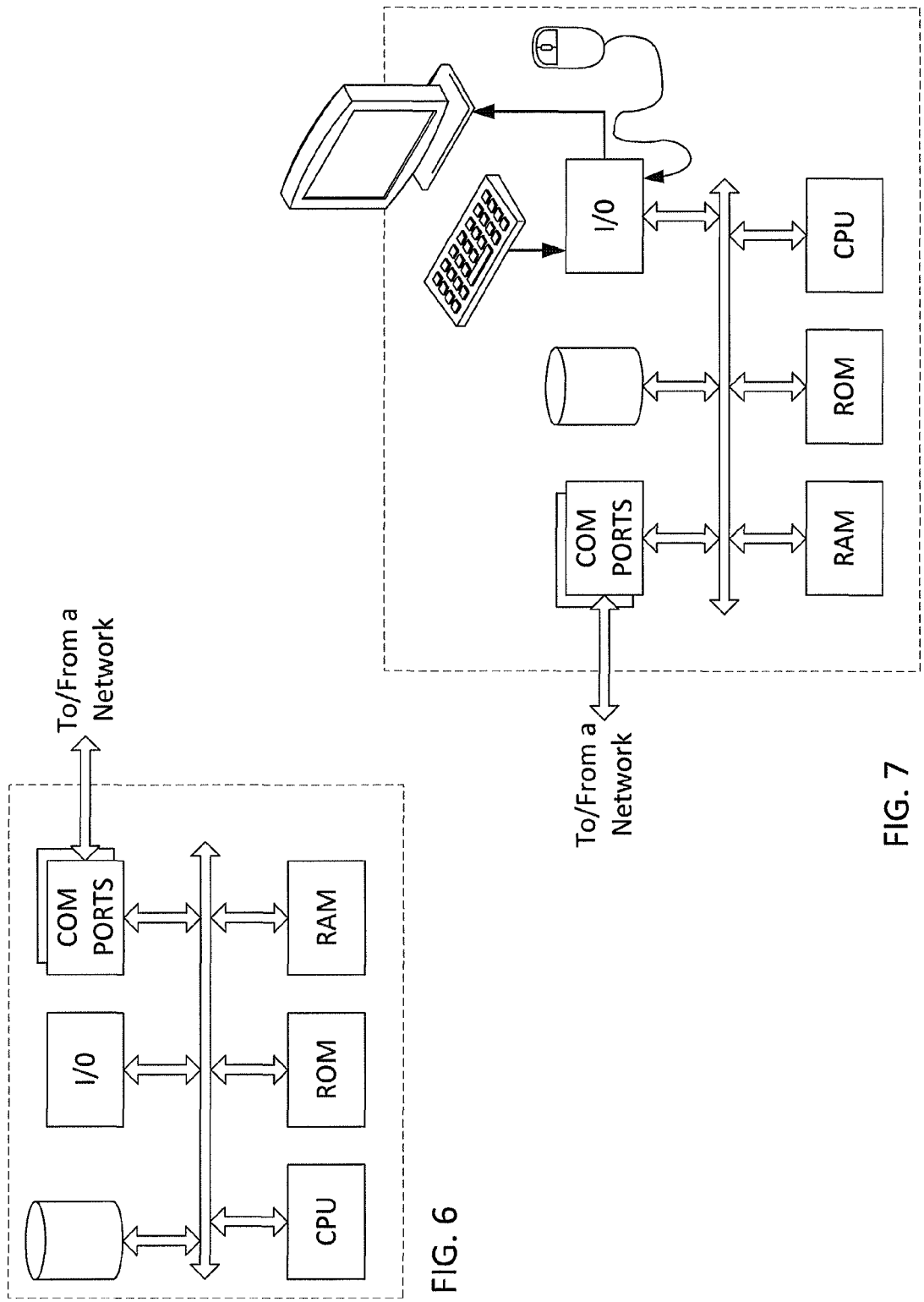

DYNAMIC MOBILE DEVICE FEEDBACK METHODS, SYSTEMS, AND APPARATUS

BACKGROUND

An exceptional customer experience is useful in capturing and retaining mobile device customers. One component of customer satisfaction is obtaining feedback from existing customers regarding their current mobile products/services. This feedback may be used by a provider of mobile products/services, for example, to troubleshoot and remedy connection problems, to determine how happy their customers are with their current mobile product/service offerings, and to update future product/service offerings based on that determination to enhance the customer experience.

Today, mobile device customers provide feedback on their mobile products/services by, for example, completing a survey on the web, calling the provider of their mobile product/service, talking with a representative in a store owned by the provider of their mobile product/service, and/or logging their comments in an online forum.

A customer feedback session may be started because a customer requests assistance of a customer service representative in addressing an issue the customer is having with their mobile device or their network service. During a typical session, the customer may provide his or her customer identification number, telephone number (e.g., mobile device number (MDN)), the identifier of the mobile device (IMEI or ISMI), the model of the mobile device, and the manufacturer of the mobile device, to a customer service representative and/or to a system used by the representative. Based on "symptoms" of the problem the customer is experiencing, the customer service representative follows a "script" from a user interface in order to identify (i.e., "troubleshoot") the cause of the problem, and hopefully resolve the problem. If the problem is likely with the mobile device, the troubleshooting often involves an interaction between the customer and the customer service representative during which the customer is asked to manually change different operating or device configuration parameters in the mobile device to assist in identifying and/or resolving the problem.

This interaction between the customer service representative and the customer may be time consuming and require the customer to perform various changes to mobile device settings, verbally provide long strings of alphanumeric characters to the customer service representative, and the like. As a result, the customer, even when the problem is resolved, may provide feedback indicating that the call was a negative experience due to the time it took for the issues to be resolved. Also, any errors made during this exchange with the representative can be very frustrating to the customer. In order to assist both the customer and the customer service representative in quickly resolving the customer's mobile device problem, a set of protocols were developed.

The Open Mobile Alliance (OMA) Device Management (DM) working group and the Data Synchronization (DS) working group have defined a device management protocol (DM) that provides a unified client/server interface to device management. The unified interface reduces the amount of manual tasks that a customer has to perform with the mobile device. The OMA DM is more robust in terms of remote device diagnostics than other remote device diagnostic solutions of original equipment manufacturers (OEMs).

The device manufacturers (i.e., OEMs) that do install OMA DM when manufacturing mobile devices typically implement a DM client that is packaged with OMA DM firmware on each mobile device. The OMA DM client interacts with an OMA DM server to provide remote device management. The OMA DM server is typically implemented by a mobile network operator (MNO) that provides mobile communication services (e.g., voice and data communications) to the customer. The OMA DM protocol specifies an exchange of data packages during a session. The OMA DM server initiates troubleshooting commands and the OMA DM client is expected to execute the commands and return a troubleshooting result via a reply message. The results are limited to information about the device on which the OMA DM client is installed (e.g., mobile device number (MDN), firmware version, etc.).

Better feedback mechanisms would enable a provider of mobile products/services to better serve and anticipate the needs of their customers. Accordingly, better mobile devices feedback methods, systems, and apparatus would be useful.

BRIEF DESCRIPTION OF THE DRAWINGS

The drawing figures depict one or more implementations described herein, by way of non-limiting example only. In the figures, like reference numerals refer to the same or similar elements.

FIG. 4 illustrates an example of device information that may be captured from the mobile device;

FIG. 6 is a simplified functional block diagram of a computer that may be configured as server, for example, to function as the feedback server in the system of FIG. 1; and FIG. 7 is a simplified functional block diagram of a personal computer or other work station or terminal device.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Unfortunately, current methods wireless customers use to provide feedback on a company's mobile products/services (e.g., by completing a survey on the web, calling the company, talking with a representative in the store, or logging their comments in a online forum) fail to meet some important needs, such as:

The customer being able to provide feedback at or near the moment they are experiencing an issue or concern with their mobile device (i.e., the feedback is real-time and not time-delayed).

The company being able to request the feedback at or near what the company may deem critical moments, for example, just after the mobile device drops a call or receives a software update.

The company being able to receive the feedback in the "voice-of-the-customer," not mediated by, for example, a call center agent or store personnel.

The customer's input being easily integrated into other sources of customer data, for example, the customer's account information and previous history of customer contacts.

The customer's input being paired with data pulled off of the mobile device itself, for example, the make and model of the phone, battery level, and signal strength.

Survey questions that can be dynamically adjusted based on the status of the mobile device, the previous activities of the customer on the mobile device and/or the customer's profile, the mobile device's location, and/or even responses to previous questions in the same survey.

The various examples disclosed herein relate to a dynamic customer feedback system that may utilize a combination of a feedback server (FS) and a device feedback client (DFC) executing on a mobile device, to address one or more of the needs outlined above. The FS and the DFC may support the DM protocol. The dynamic customer feedback system may use the FS and DFC to retrieve device parameters, solicit feedback from the user of the mobile device, and receive the solicited feedback. Using the combination of the FS and DFC, the disclosed examples may provide dynamic mobile device feedback. Reference now is made in detail to the examples illustrated in the accompanying drawings and discussed below for providing mobile device feedback.

Figure 1:
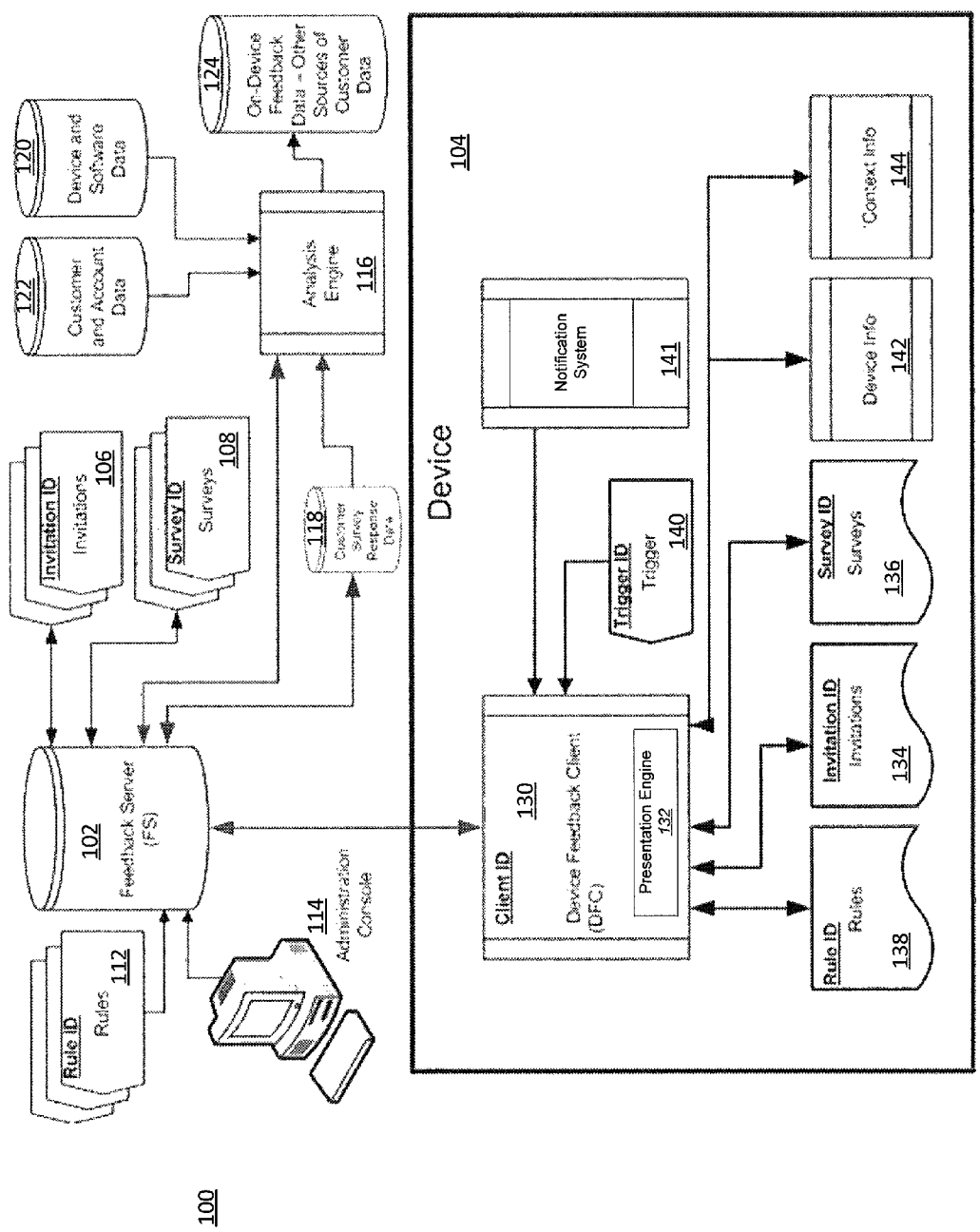
FIG. 1 is a block diagram illustrating an example of a dynamic mobile device feedback system.

FIG. 1 depicts a mobile device feedback system 100. The mobile device feedback system 100 includes a feedback server (FS) 102 and device feedback client (DFC) 130 residing on a mobile device 104 remote to the FS 102. Suitable feedback servers and device feedback clients for use in system 100 will be understood by one of skill in the art from the description herein.

The FS 102 manages feedback solicitation inquiries and presentation rules. The feedback solicitation inquires may include invitations (maintained in an invitation ID database 106) and surveys (maintained in a survey database 108). The presentation rules (which may be maintained in a rules database 112) define when and/or how the feedback solicitation inquiries are to be presented by the mobile device 104. The FS 102 may be used to define the feedback solicitation inquiries and presentation rules (e.g., via an administration counsel 114), transmit feedback solicitation inquiries and presentation rules to the mobile device 104 (e.g., the DFC 130 of the mobile device 104), monitor responses to the feedback solicitation inquiries received from the mobile device 104, and analyze the responses to the feedback solicitation inquiries. The FS 102 may push the feedback solicitation inquiries and presentation rules to appropriate DFCs 130, e.g., based on criteria like the type of mobile device, the software version running on the mobile, to customers with a particular service plan, etc.

The FS 102 may interface with an analysis engine 116. Feedback received by the FS 102 may be stored by the FS 102 in a customer survey response data database 118 and provided to the analysis engine 116. The analysis engine 116 may retrieve information related to the mobile device 104 (e.g., from a devices and software data database 120) and information related to the registered owner of the mobile device 104 (e.g., from a customer and account data database 122). The analysis engine 116 may send information based on analysis of the responses to the feedback solicitation inquires and the various databases to an accumulation database 124 that stores data retrieved from multiple mobile devices and the various other databases. The analysis engine 116 may analyze data from the accumulation database 124 to identify patterns (e.g., common problems and/or solutions to problems). Additionally, the analysis engine 116 may post common problems and/or solutions to internal and/or external platforms (not shown) to enable troubleshooting by customers and/or company representatives. Although depicted as a separate component, the analysis engine 116 may be incorporated into the FS 102. Additionally, the FS 102 may incorporate the functionality of a DM server (e.g., an OMA DM server) or may be a separate server.

An "invitation" may be a screen, popup, button, or other notification (e.g., visual, audio, etc.) that is provided to the user by the user's mobile device at a specified time, inviting them to provide the company with feedback. The presentation rules could specify, for example, Invitation #7 is displayed to the customer whenever they are on the Wi-Fi settings page, Invitation #8 is displayed to the customer three days after the initial activation of a device, and/or Invitation #9 is displayed immediately after the customer resets their mobile device.

A "survey" may be one or more questions that are presented (e.g., visually and/or aurally) to the user of the mobile device. The survey presented may be determined by the presentation rules. For example, the presentation rules could specify: present survey #14 if the customer responded affirmatively to Invitation #8 and if the device profile (described in further detail below) matches pre-defined criteria (e.g., device memory is more than 80% full), but display Survey #15 if the customer responded affirmatively to Invitation #8 and if the device profile matches other pre-defined criteria (e.g., device memory is less than 80% full); present Survey #18 if the customer accessed the on-device help utility 4 or more times in the past 24 hours; and/or present Survey #19 if the customer has an unlimited data plan, a mobile wallet application, and has called customer care in the past 12 hours.

The DFC 130 of the mobile device 104 presents feedback solicitation inquiries in accordance with presentation rules and collects related data. The DFC 130 in the illustrated mobile device 104 includes a presentation engine 132. The DFC 130 may be configured to receive feedback solicitation inquiries and presentation rules from the FS 102, present the feedback inquires in accordance with the presentation rules, gather data related to the mobile device 104 and/or from a user of the mobile device in response to the feedback solicitation inquiries, and transmit the gathered data to the FS 102. The DFC 130 may incorporate the functionality of a DM client (e.g., an OMA DM client) or may be a separate client.

In an example, the DFC 130 receives invitations, surveys, and presentation rules from the FS 102. The DFC 130 may receive invitations, surveys, and presentation rules pushed to it by the FS 102. The FS 102 may push the invitations, surveys, and presentation rules to the appropriate DFCs 130, e.g., based on criteria like the type of mobile device, the software version running on the mobile device, to customers with a particular service plan, etc. The DFC 130 may store the received invitations, surveys, and presentation rules for later retrieval in an invitation database 134, a survey database 136, and a rules database 138, respectively. Subsequent invitations, surveys, and presentation rules from the FS 102 may be stored in the DFC 130 in addition to currently stored invitations, surveys, and presentation rules; may replace currently stored invitations, surveys, and presentation rules; or may be provided as updates to the currently stored invitations, surveys, and presentation rules. The DFC 130 may be coupled to a trigger source 140 to receiver "Triggers" when events occur on the mobile device 104, e.g., a factory reset, software update, or if an application is closed. In an example, a trigger may be an event broadcast by a notification system 141 such as an Android Broadcast Manager System.

Using the presentation engine 132, the DFC 130 may first present an invitation via the mobile device 104 asking the user whether they want to provide feedback. If the user answers affirmatively, the DFC 130 may then present a survey via the presentation engine to the user of the mobile device. The DFC 130 may collect input data provided by the user in response to the survey. Additionally, the DFC 130 may collect and store device information as specified in the presentation rules, e.g., in a device information database 142 and a context information database 144. The device information database 142 may store static device information such as the type of processor and memory and the context information database 144 may store dynamic device information such as the amount of memory currently available and the number of times "Help" has been accessed in the last 12 hours.

Feedback may be collected from the user of the mobile device using text boxes, radio button, drop-down menus displayed on a screen of the mobile device. Alternatively, or additionally, feedback may be input by speech (e.g., via a microphone), visually (e.g., via a camera), and/or by motion (e.g., via an accelerometer). Speaking a response to a question like "What do you like most about your phone?" could be more natural for the customer. Moreover, additional information can be gleaned from the response like emotional state (often called "sentiment"), background noise, pauses, accents, etc., all of which could be used to better understand the customer's response. In one example, the FS 102 can, in real-time, transcribe the speech to present follow-up queries. For example, if the customer's response includes the words "email setup," then a follow-up question in another survey could be presented "Please tell us what email providers you use." Emotional state may be obtained by analyzing a biometric feature of the user. In one example, a customer's verbal response may be compared to a previously recorded "control" response to determine if there is a change that would indicate a changed emotional state such as anger or frustration. In another example, the verbal response may be analyzed to identify emotional state based on dynamic range, portion of sentence stress, etc. In another example, a biometric parameter, e.g., pulse, may be obtained via the mobile device for comparison to a previously recorded pulse rate to identify a changed emotional state.

The DFC 130 may assemble the input provided by the user and the device information collected from the mobile device 104. The DFC 130 may then send the assembled user input and device information to the FS 102. The DFC 130 may assemble the user input and device information into a data stream and packetize the data stream for transmission to the FS 102. Additionally, the DFC 130 may tag the collected information with the Device ID, Customer ID, Invitation ID and/or Survey ID. In one example, the DFC 130 may assemble the input as it is provided by the user to the mobile device. In another example, the DFC 130 stores input from the user as it is being received and, then, assembles the input by retrieving it from the memory when a complete response to the last query is provided (e.g., determined based on a predefined time after the last query and/or a predefined period of inactivity following a received response). The assembled information may be transmitted responsive to parameters identified in the rules. In one example, the assembled information may be assembled and transmitted substantially in real-time as it is being received from the user. In another example, the assembled information may be transmitted in response to all input from a particular query being provided. In another example, the assembled information may be transmitted when the mobile device is not currently in use. In another example, the input may be assembled and/or transmitted in response to an action by the user of the mobile device such as selecting a "Send" button/key.

Unlike static surveys, because the FS 102 has access to the customer's profile and account information (e.g., from a customer and account database 122), and because the DFC 130 has access to device information, as well as the customer's usage history (e.g., the customer has accessed the help application 4 times in the past 12 hours), a powerful "feedback system" can be realized. For example, because the DFC 130 has access to device information, a survey could request that the use of the mobile device perform various actions, e.g., to turn on then off Wi-Fi. The DFC 130 can then monitor the customer's key presses during the task and the device's response, and then display a follow up question or task based on the data observed.

The DFC 130 and FS 102 may be linked in real-time via a communication channel (e.g., Wi-Fi or cellular). The FS 102 is able to adjust the presentation rules and surveys responsive to input from the mobile device user. For example, the survey could include a question like "do you find the responsiveness of the touch-screen satisfactory?" If the answer was no, then the FS 102 could adjust a survey sent to the DFC 130 to display a sequence of touch points with the instructions to tap the touch points as quickly as possible. If the customer's response showed no impairment of the touch screen, then the DFC 130 could examine the processes running in the background (a task that is difficult, if not impossible, for most users to do on their own).

The FS 102 may include predictive models/analytical tools for analyzing information received from the DFC 130. The tools may correlate/process information to determine, for example, the number of times a customer has called regarding a problem, the expected life of the mobile device hardware versus the number of times a particular issue was reported, specific details regarding the device (e.g., was the problem found on a certified like-new replacement/refurbished device), past testing performed on the device, likelihood of a customer issue being identified by the company before it is reported by the customer, probability of mobile device having future problems, the probability of an issue happening on the device for which its getting returned, the probability of a customer calling for a particular problem on a particular device, validating the occurrence of a problem after the expected life of a component is over, average cost per issue for issue categories (e.g., Network, Application, OS etc.), the average time spent on closing (investigation and analysis) an issue, and the average time spent on executing a test case. Analytical information (such as the probability of a mobile device being returned, validation of a return against the probability of failure, etc.) may be provided to an automated customer support system (ACSS), for example, on per customer account basis.

The FS 102 may maintain a record of every invitation sent to a customer and/or every survey completed. This enables the FS 102 to provide several functions. In one example, the FS 102 may determine when additional invitation/surveys should or shouldn't be pushed to the DFC 130 based on past responses. For example, if the user has not responded to 5 consecutive invitations, the FS 102 may cease sending inquires to that customer to avoid becoming a nuisance. In another example, the FS 102 may manage rewards offered to users who respond to queries, e.g., in order to increase the chance that a customer will provide feedback. For example, the FS 102 may monitor feedback received from a mobile device user and push out a reward (e.g., a coupon) based on the feedback received. Information about a particular reward for providing particular feedback may be provided to the user along with providing the user with the invitation to provide the particular feedback. The rewards may differ depending on the characteristics of the desired feedback (e.g., survey length, number of responses desired, importance) as well as characteristics of the user, such as how often they answer inquiries.

The FS 102 may also monitor one of more social media networks. If these sources include a relatively large number of postings regarding a particular mobile product (e.g., a particular mobile device, collection of mobile devices with particular processor/memory configuration, etc.), feedback information queries/rules may be sent soliciting feedback from users having those mobile products, e.g., to solicit information that may be useful in resolving the issues and/or proactively addressing the issues.

The connection between the DFC 130, the FS 102 and other databases maintained/monitored by the company providing the mobile device allows the capability to validate customer information and/or mobile device information, e.g., using data from other customers. For example, if the owner of a Mobile Phone Model MP responds to a survey that he is having an intermittent problem with dropped calls after a software update, the FS could query the customer databases to identify other Model MP customers who just received a software update, immediately push a survey to those customers, and then quickly determine if this is a common problem customers are experiencing or a unique problem. (And moreover, using the device information, the company could determine if there is some particular device configuration that is resulting in dropped calls.)

Additionally, the FS 102 may be configured to query company databases to quickly deliver targeted surveys when the company sees a potential problem surfacing. A company may have extensive internal forums used by call center and store representatives that track and resolve problems. In the example above, the FS 102 could also query internal forums to see if there have been recent reports of excess dropped calls from, for example, Model MP customers, to confirm/validate that this is a known problem. In addition to monitoring field problems, these internal forums often post "crowd-sourced" or "expert-tech" fixes to observed problems. The FS 102 may assemble proposed solutions to the issue from the network forum. The proposed solutions could be pushed to the customer(s) reporting the problem, presented to customer service representative, and/or posting to the same and/or a different network forum. All this could take place within minutes or hours. Conventional systems are unable to provide a similar solution without extensive human involvement taking days (e.g., customer reports problem, then company determines if this is a "trending" problem and what the recommended fix is, and then the recommended fix is pushed to the customer).

Figure 2:
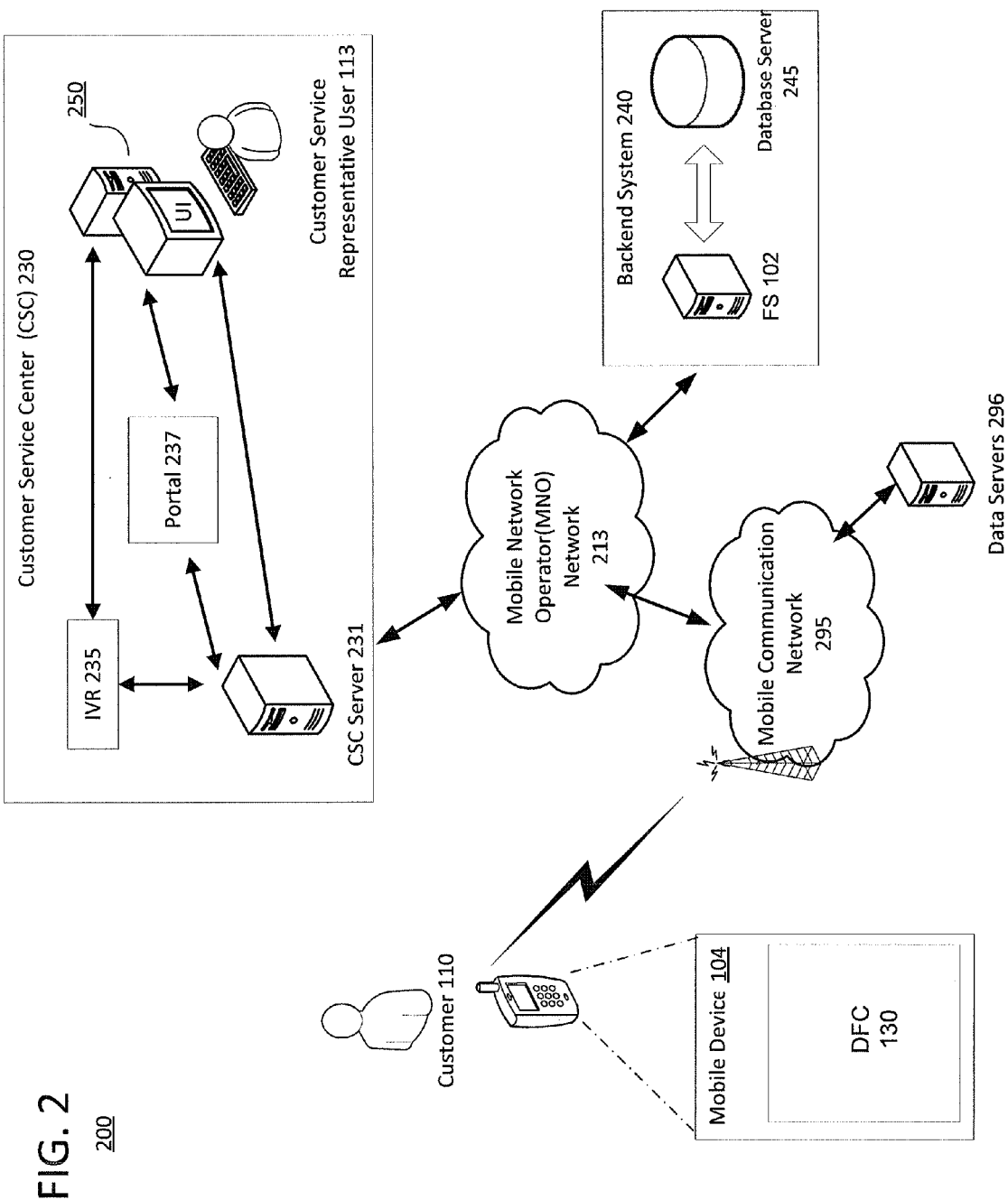
FIG. 2 is a block diagram of the dynamic mobile device feedback system incorporated into a customer service system.

FIG. 2 depicts the FS 102 and mobile device 104 of mobile device feedback system 100 in a customer service system 200. The customer service system 200 may include a customer service center 230, a backend system 240 (where the FS 102 resides in the illustrated example), a mobile network operator (MNO) network 213, and a mobile communications network 295.

The mobile device 104 may be a voice and data communication device that receives voice and data communication services from a MNO (such as Verizon®, AT&T® and the like) that provides the mobile communications network 295. The configuration parameters of the mobile device 104, such as Wi-Fi configuration settings, Bluetooth configuration settings, network settings and the like, may be modified via the DFC 130 residing on the mobile device 104. Although the depicted mobile device is a hand-held voice and data communication, it is to be understood that other device capable of data communication, e.g., wristbands capable of data communication with/without voice capability, tablets, etc. may be used in exampled presented herein.

The mobile communications network 295 may be a wireless voice and data communications network through which mobile devices, such as mobile device 104, communicate with one another and with various servers, such as data servers 296. A data server 296 may provide different data content, such as websites (news, educational information and the like), videos, audio, gaming and other media. A mobile device user, such as customer 110, may be a subscriber to services provided by a MNO that may provide the mobile communications network 295. The MNO may also have a private network, such as MNO network 213, over which the MNO conducts business (e.g., related to the operations of the MNO) as well as provides support services for the mobile communications network 295. For example, the customer service center 230 may communicate with other components (e.g., customer billing system, employee intranet, the backend system 240 and the like) of the MNO via the MNO network 213.

The customer service center (CSC) 230 may be provided by the MNO, such as the MNO that provides the MNO network 213, which provides voice and data communication services to the mobile device 104. The CSC 230 may include, for example, a system of servers, such as CSC server 231, configured to receive a large number of telephone calls. A point of contact for customers with the customer service center 230 may include an Interactive Voice Response (IVR) system 235. The CSC server 231, other servers (not shown) and switching components connect the received calls to the IVR 235 that facilitates the connection of the customer 110 to a customer service representative 113, if necessary, based on customer 110 responses to specific queries, best equipped to handle the customer's 110 call. The CSC 230 may be a local service center within, for example, a retail store or a remote service center.

The customer service center 230 may provide a portal 237, which provides a graphical user interface on a customer service representative terminal 250 that allows the customer service representative (i.e., a user) 113 to access information via the CSC server 231 in servers and databases maintained by the backend system 240, and also modify information related to the mobile device 104. Through the portal 237, the customer service representative is able to obtain additional information from the backend system 240 to perform their customer service function. For example, the customer service representative 113 is able to obtain mobile device information via the backend system 240.

The backend system 240 may include the FS 102. Additionally, the backend system 240 may include a database server 245 as well as connections to the mobile communications network 295 and the MNO network 213. The backend system 240 may communicate with the CSC 230 via the backend connections to the MNO network 213, and with the mobile device 104 via the backend connections to the mobile communication network 295.

If the FS 104 and DFC 130 are configured to support the DM protocol (or other protocol that is implemented in a similar manner), the FS 104 may provide device management functions (e.g., OMA device management functions and extensions described herein) that allow a customer service representative 113 and/or the FS 104 to enable and disable configurations on the mobile device 104. For example, the FS 102 may be configured to exchange messages in a DM-like session defined by the DM protocol with the mobile device 104. The DM-like session communications between the DFC 130 and the FS 102 may use "Secure Sockets Layer" (SSL) or "Transport Layer Security" (TSL) protocol over HTTP. Based on the DM diagnostic version number retrieved from the DFC 130, the FS 102 may identify a set of diagnostic information that can be retrieved or configured. The FS 102 is then able to retrieve mobile device information and modify (e.g., enable or disable) device settings related to one or more of provisioning the device, device configuration, software upgrades and fault management.

Figure 3A:
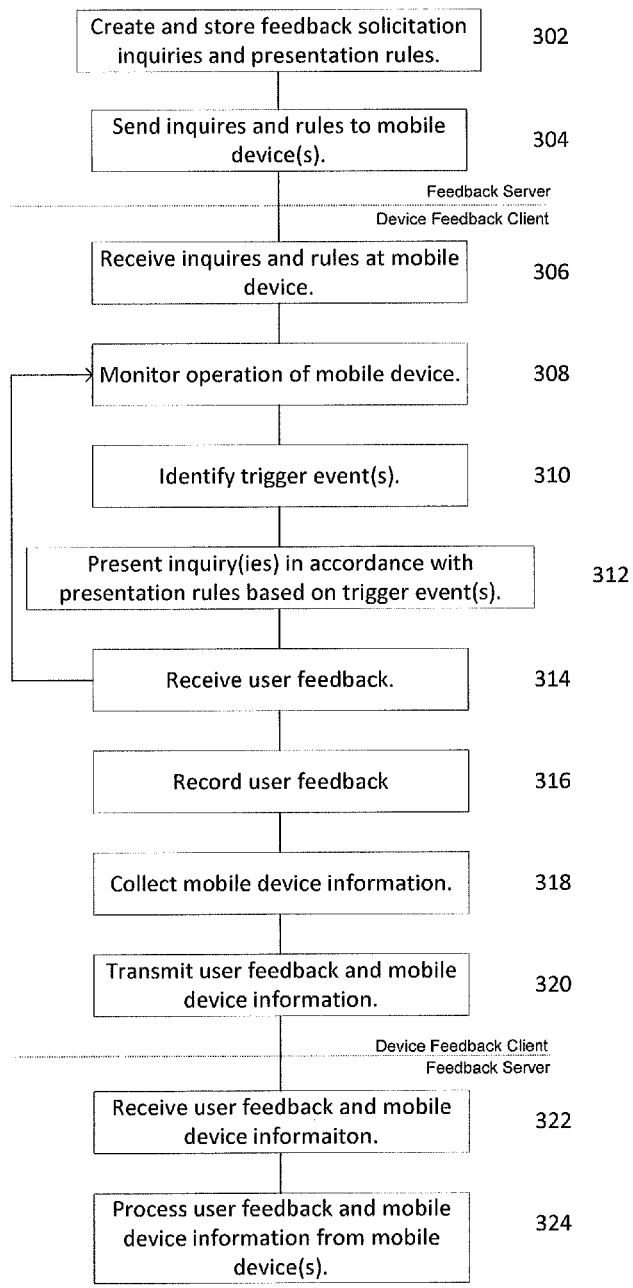
FIG. 3A is a flowchart of an example of a dynamic mobile device feedback method.

FIG. 3A depicts a flowchart 300 providing an example of a dynamic mobile device feedback process according to examples disclosed herein. To facilitate description, the steps of flowchart 300 (and other methods/processes) are described with reference to the systems described above and depicted in FIGS. 1 and 2. Other systems for implementing the methods/processes described herein will be understood by one of skill in the art from the description herein. Additionally, the order of the steps in the methods/processes are provided by way of example and it is to be understood that additional steps may be added, one or more of the steps may be performed out of order, and/or one or more of the steps may be omitted.

At block 302, feedback solicitation inquiries and presentation rules are created and stored. The feedback solicitation inquiries and presentation rules may be created using the administration console 114 and stored on the FS 102. Different feedback solicitation inquiries and presentation rules may be created for different mobile devices (e.g., based on mobile device characteristics such as processor type, model number, etc.), different users (e.g., based on customer characteristics such as service plan, number of years as a customer, etc.), different situations, different environments, etc.

At block 304, the feedback solicitation inquiries and presentation rules are sent to one or more mobile devices. The FS 102 may send the feedback solicitation inquiries and presentation rules to the mobile devices. The FS 102 may push the feedback solicitation inquiries and presentation rules to certain devices based on mobile device characteristics, customer characteristics, etc.

At block 306, the mobile devices receive and store the feedback solicitation inquiries and presentation rules. The DFC 130 within each mobile device 104 may receive the feedback solicitation inquiries and presentation rules and store the receive feedback solicitation inquiries and presentation rules in memory within the mobile device.

At block 308, operation of the mobile device is monitored. The DFC 130 may monitor the mobile device 104 based on predefined monitoring rules and/or the received presentation rules. In an example of predefined monitoring rules, trigger events may be predefined in the DFC 130, e.g., a hard reset, a service call, accessing an on-board help application, a system update, etc. In an example of received presentation rules, trigger events may be defined by the received presentation rules, e.g., a hard reset, a service call, a system update, etc. In an example of predefined monitoring rules and received presentation rules, some triggers may be predefined (e.g., a hard reset, a system update, etc.) and others may be received presentation rules (e.g., a service call, accessing an on-board help application, etc.). Other trigger events may include selecting a displayed button, actuating a button, performing a series of action, bringing the mobile device within the vicinity of the particular global location (e.g., a mobile device store), spoken word(s) picked up by the microphone, a particular movement of the device (e.g., vigorous shaking), etc.

At block 310, one or more trigger events are identified. The DFC 130 may identify the trigger events by applying predefined monitoring rules and/or the received presentation rules to aspects of the mobile device 104 being monitored by the DFC 130.

At block 312, one or more inquiries may be presented based on the identified trigger event(s). The DFC 130 may determine which inquiry(ies) to present based on the predefined monitoring rules and/or the received presentation rules as applied to the identified trigger events. In one example, the DFC 130 presents the inquiries on the mobile device where it resides. In another example, the DFC 130 transmits the inquiries to another device. For example, if the mobile device doesn't have a display, e.g., a wrist band without a display, the mobile device may transmit the inquiries to another device, e.g., a tablet computer paired to the mobile device, for presentation.

At block 314, feedback is received from the user of the mobile device. The feedback may be receive by the DFC 130 via a user interface (e.g., a verbal feedback response received via a microphone 402 (FIG. 5), a tactile feedback response via a touch-screen display 520 (FIG. 5), etc.). Processing may loop back to block 308, with blocks 308-314 repeated to continue monitoring the mobile device, identify trigger events, present queries, and receive user feedback. In one example, the feedback response to one query (e.g., an affirmative response to an invitation) is a trigger that results in another query (e.g., a survey) being presented in block 312 to gather feedback in block 314. In another example, the trigger may be an action performed by a user (e.g., launching an application, selecting a displayed button, pressing a button, performing a series of action), that results in a survey query without first presenting an invitation query. Where, the DFC 130 transmits the inquiries to another device, the DFC 130 may receive the feedback via this other device.

At block 316, feedback is recorded. The feedback may be recorded by the DFC 130 in memory of the mobile device 104.

At block 318, mobile device information is optionally collected. The mobile device information may be information about the mobile device not provided by the user, e.g., the percentage of memory currently being used, the percentage of battery charge, whether Bluetooth is currently enabled, etc. The DFC 130 may collect the mobile device information. FIG. 4 depicts examples of mobile device information that may be collected. The mobile device information obtained may be different based on the type of device and/or the information desired. The type of information returned may be specified in the rules. In one example, the rule may specify that a first set of information is gathered if a mobile device has first type of processor and may specify that a second set of information is gathered if the mobile device has a different type of processor. In another example, the rule may be set up to only gather certain information necessary to troubleshoot a particular issue, e.g., signal strength and operating system version may be gathered to troubleshoot dropped calls. This reduces the amount of bandwidth required to transmit the information or just sending all mobile device information available.

Figure 5:
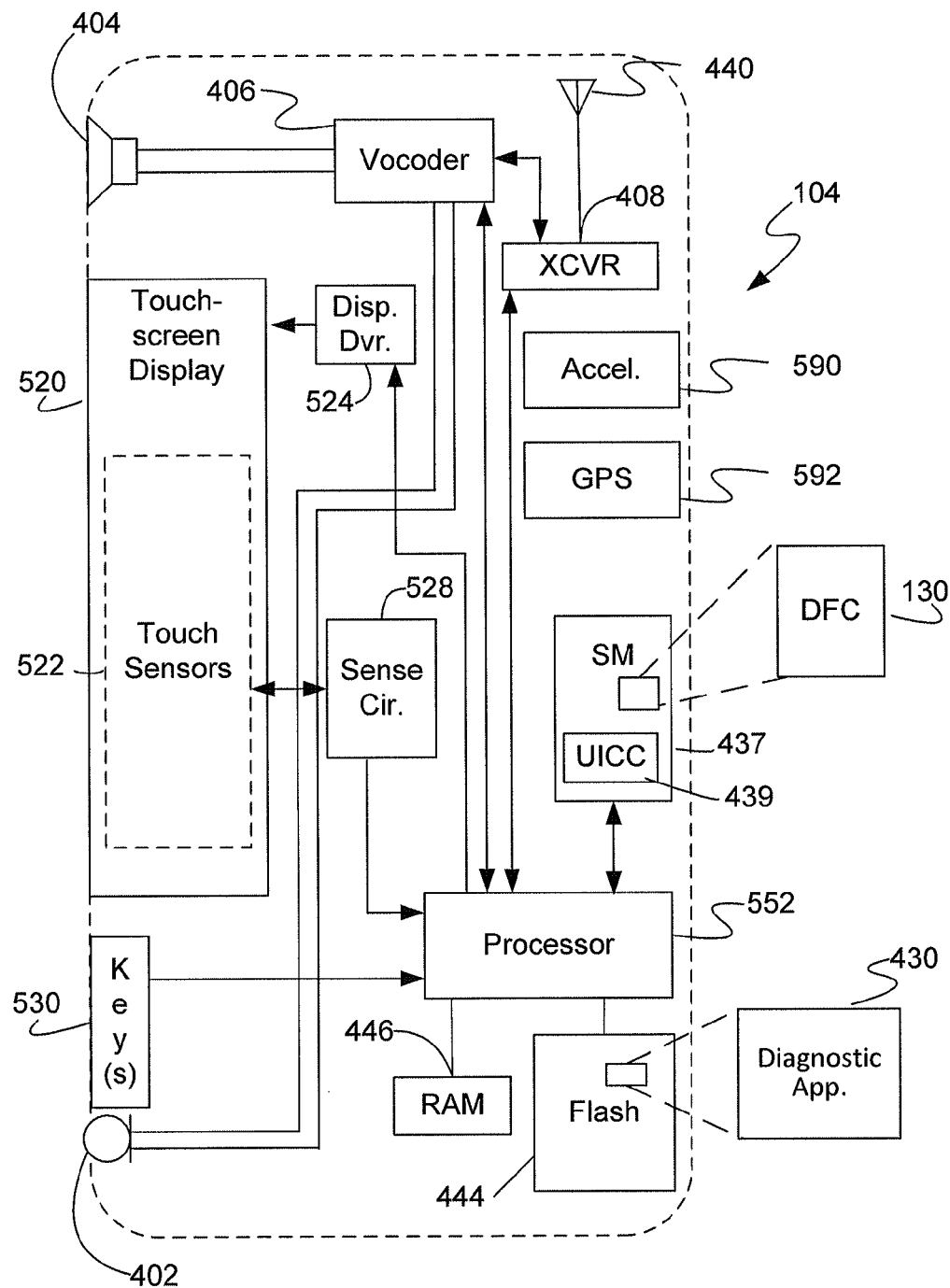
FIG. 5 is a high-level functional block diagram of an example of a touch screen type mobile device as may be utilized in the feedback system like that shown in FIG. 1.

Referring back to FIG. 3A, at block 320, the user feedback and, optionally, the mobile device information is transmitted. The DFC 130 may transmit the user feedback and, optionally, the mobile device information to the FS 102 (e.g., via transceiver 408 and antenna 440; FIG. 5).

At block 322, the user feedback and, optionally, the mobile device information is received and stored at memory of the FS 102. The FS 102 may receive the user feedback and, optionally, the mobile device information.

At block 324, the user feedback and, optionally, the mobile device information is processed by a processor of the FS 102. The FS 102 may process the user feedback and, optionally, the mobile device information. In processing the user feedback, the FS 102 may apply predictive models/analytical tools to the user feedback and optional mobile device information received from one or more mobile devices, e.g., to validate reasons for return, predict probability of a future failure, etc.

Figure 3B:
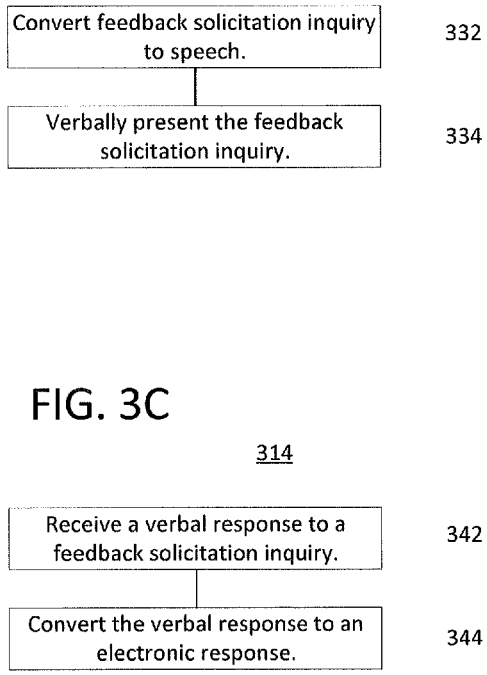
FIG. 3B is a flowchart of an example of presenting a feedback solicitation inquiry for use in the dynamic mobile device feedback method of FIG. 3A.

FIG. 3B depicts one method for presenting the inquires of block 312. At block 332, feedback solicitation inquiries are converted to speech. The feedback solicitation inquiries may be converted to speech by a vocoder 406 (FIG. 5). The DFC 103 may send the feedback solicitation inquiry via processor 552 to vocoder 406 for conversion to speech. At block 334, the converted feedback solicitation inquiry may be audibly presented to the user of the mobile device 104, e.g., via speaker 404.

Figure 3C:
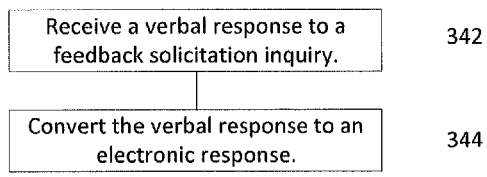
FIG. 3C is a flowchart of an example of receiving feedback for use in the dynamic mobile device feedback method of FIG. 3A.

FIG. 3C depicts one method for receiving the feedback of block 314. At block 342, verbal feedback is received by the mobile device 104, e.g., via microphone 402. At block 344, the verbal feedback is converted to an electronic response. The verbal feedback may be converted to an electronic response by a vocoder 406 (FIG. 5). The electronic response is then routed via processor 552 to DFC 103.

An example of a mobile device suitable for interaction with the feedback server 104 is illustrated in FIG. 5. For purposes of such a discussion, FIG. 5 is a high-level functional block diagram of an example of a touch screen type mobile device 104 as may be utilized in the dynamic feedback system. Although the mobile device 104 of FIG. 5 may be a smart-phone or may be incorporated into another device, such as a personal digital assistant (PDA), tablet, communication device worn on the wrist, or the like, for discussion purposes, the illustration shows the mobile station 104 is in the form of a handset. The handset embodiment of the mobile device 104 functions as a normal digital wireless telephone device. For that function, the station 104 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (i.e., Internet Protocol) communications. Additionally, the vocoder 406 may provide text to speech and/or verbal response to electronic response processing.

For digital wireless communications, the handset 104 also includes at least one digital transceiver (XCVR) 408. The handset 104 would be configured for digital wireless communications using one or more of the common network technology types. The concepts discussed here encompass embodiments of the mobile device 104 utilizing any digital transceivers that conform to current or future developed digital wireless communication standards. The mobile device 104 may also be capable of analog operation via a legacy network technology.

In order to secure the operation of the DFC 103, the DFC 103 may be implemented in a secure memory (SM) 437. In one example, the SM 437 is separate chip that includes a secure processor, a tamperproof storage and a memory, and is configured to communicate with applications executing on the processor 552 and to maintain the device parameters stored therein by the DFC 130. In another example, the SM 437 is a memory that is part of the system memory of the mobile device 104, and is configured to maintain the enrolled templates stored therein by the DFC 130. The SM 437 may be a physically secure memory, a physical secure memory with a secure controller that may contain a matching algorithm, part of the system memory (less secure) with cryptography and obfuscation algorithms (the processor 552 may be configured perform these functions), or part of the system memory but the processor 552 may be in a secure mode (e.g., ARM Trust Zone®) to perform the encryption function and to keep the encryption process and keys secure. The SM 437 may also serve as the diagnostics status memory of the mobile device 104 that may be used to determine if the mobile device 104 is already registered with a server in the backend system 240.

For example, a diagnostic application 430 and DFC 130 running on the secure memory (SM) 437 typically run on a Javacard operating system. The SM may include various account information, such as account number, user identification, a personal identification number (PIN), or the like for user verification and possibly account balance and/or transaction record information. The SM 437 may be used to decode credentials of devices. In various examples, the SM 437 may be part a UICC 439 or a separate SM-like memory card, such as a secure digital (SD) memory card, used for storing and accessing applications and data, such as the diagnostic application 430 and DFC 130, in a secure manner. The logic implemented by the processor 552 of the mobile device 104 configures the processor 552 to control various functions as implemented by the mobile device 104. The logic for a processor may be implemented in a variety of ways, but in one example, the processor logic is implemented by programming for execution by the processor 552.

The transceiver 408 provides two-way wireless communication of information, such as vocoded speech samples and/or digital information, in accordance with the technology of the network. The transceiver 408 also sends and receives a variety of signaling messages in support of the various voice and data services provided via the mobile device 104 and the communication network. Each transceiver 408 connects via send and receive amplifiers (not separately shown) to an antenna 440. The transceiver may also support various types of mobile messaging services, such as short message service (SMS), enhanced messaging service (EMS) and/or multimedia messaging service (MMS).

Processor 552 serves as a programmable controller for the mobile device 104, in that it controls all operations of the mobile device 104 in accord with programming that it executes, for all normal operations, and for operations involved in the mobile device feedback under consideration here. The processor 552 is a circuit element configured to implement the appropriate device control logic, typically in the form of one or more chips configured to implement a programmable central processing unit functionality, such as one or more microprocessor chips.

In the example, the mobile device 104 includes flash type program memory 444, for storage of various "software" or "firmware" program routines and mobile configuration settings, such as mobile directory number (MDN) and/or mobile identification number (MIN), etc. The mobile device 104 may also include a non-volatile random access memory (RAM) 446 for a working data processing memory. Of course, other storage devices or configurations may be added to or substituted for those in the example. In a present implementation, the flash type program memory 444 stores firmware such as a boot routine, device driver software, an operating system, call processing software and vocoder control software, and any of a wide variety of other applications, such as client browser software and short message service software. The memories 444, 446 also store various data, such as telephone numbers and server addresses, downloaded data such as multimedia content, and various data input by the user. Programming stored in the flash type program memory 444, sometimes referred to as "firmware," is loaded into and executed by the processor 552. For example, the flash type program memory 444 may store programming for implementing the DM client 127 of FIG. 1, and as well as programming for implementing the diagnostic application 430. The microprocessor 552 may access the programming in the flash type program memory 444 to execute the above-described remote device diagnostics functions. For example, the flash memory 444 configures the processor 552 so that the mobile device 104 is capable of performing various desired functions, including in this case the functions involved in the technique for obtaining and providing device information to the diagnostic application 430.

The processor 552 serves as a programmable controller for the mobile device 104, in that it controls all operations of the mobile device 104 in accord with programming that it executes, for all normal operations, and for operations involved in the mobile device feedback under consideration here. In the example, the mobile device 104 includes flash type program memory 444, for storage of various program routines and mobile configuration settings. The mobile device 104 may also include a non-volatile random access memory (RAM) 446 for a working data processing memory. Of course, other storage devices or configurations may be added to or substituted for those in the example. Hence, outlined above, the mobile device 104 includes a processor, and programming stored in the flash memory 444 configures the processor so that the mobile device is capable of performing various desired functions, including in this case the functions involved in the technique for providing the remote device diagnostics. For example, the flash type program memory 444 may store programming for implementing the DFC 130. However, the DFC 130 may be stored in the SM 437 since the DFC 130 may be configured to change some device parameters that typically require high levels of authorization. The processor 552 may access the programming in the flash type program memory 444 to execute the above-described diagnostic functions.

The mobile device 104 of FIG. 5 may have a limited number of keys 530, but the user interface functions of the display and keypad are replaced by a touchscreen display arrangement. At a high level, a touchscreen display 520 is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. In addition to normal telephone and data communication related input/output (including message input and message display functions), the user interface elements (e.g., keys 530, touchscreen display 520) also may be used for display of menus and other information to the user and user input of selections, including any needed during presentation of a diagnostics application menu. For example, if used to receive selections for reconfiguration of device parameters via the diagnostic application, the user interface elements may respond to various inputs from a customer 110. In addition, the user interface elements may be used to generate mobile device 120 parameter change notifications (e.g., made during a DM diagnostics session) and receive the customer 110 confirmation that such a configuration change is accepted.

Hence, the mobile device 104 includes a display 520, which the processor 552 controls via a display driver 524, to present visible outputs to the device user. The mobile device 104 also includes touch sensors 522. The sensors 522 are relatively transparent, so that the customer may view the information presented on the display 520. A sense circuit 528 sensing signals from elements of the touch sensor 522 and detects occurrence and position of each touch of the screen formed by the display 520 and sensors 522. The sense circuit 528 may provide touch position information to the processor 552, which can correlate that information to the information currently displayed via the display 520, to determine the nature of user input via the screen.

The display 520 and touch sensor 522 (and possibly one or more keys 530, if included) are the physical elements providing the textual and graphical user interface for the mobile device 104. The microphone 402 and speaker 404 may be used as additional user interface elements, for audio input and output, including with respect to the diagnostics application 430 and mobile device API (e.g., OS Open API) related functions.

The accelerometer(s) 590 sense information about the movement and/or orientation of the mobile device. The processor 552 may process information from the accelerometer(s), e.g., to determine if the mobile device is being shook by the user. The GPS 592 senses the global position of the mobile device. The processor 552 may process information from the GPS 592, e.g., to determine if the mobile device is in a particular area such as a store where mobile devices are sold.

The structure and operation of the mobile device 104, as outlined above, was described by way of example, only.

As shown by the above discussion, functions relating to the dynamic mobile device feedback may be implemented on computers connected for data communication via the components of a packet data network, operating as a diagnostics application 430 or DFC 130. Although special purpose devices may be used, such devices also may be implemented using one or more hardware platforms intended to represent a general class of data processing device commonly used to run "server" programming so as to implement the remote device diagnostics functions discussed above, albeit with an appropriate network connection for data communication.

Examples described herein enable not only collecting targeted customer feedback, capturing device data, monitoring usage history or utilizing customer and account data, but the combination of all of these, along with an analytics engine, to uncover issues, propose solutions and track fixes. The power of systems such as those described herein can be illustrated in the following three examples.

First. The DFC 130 on the mobile device 104 receives a trigger after the customer factory-resets their phone for the second time in 8 hours. The DFC 130 displays an invitation to the customer to provide their carrier (e.g., Verizon) with their feedback. In a subsequently provided survey, the customer may speak their response. The speech-to-text engine (e.g., vocoder 406) determines that the customer is having an issue with "slow response time." This information may be coupled with processor and application data from the device. The analysis engine 116 coupled to the FS 102 may determine that a certain application is misbehaving, e.g., over-using system resources. For example, the DFC 130 may send the FS 102 a listing of all application currently on the active device and the system resources being consumed by each application. If one or more applications appear are outside of predefined parameters, the user may be asked to close the suspicious application(s) to see if it improves performance. The whole process may be automated and take place in seconds. In summary, examples of systems described herein could not only provide the service provider with valuable feedback from the customer to help improve the offered devices and services, but it could also provide recommended fixes to problems in real-time.

Second. A customer may walk into a store to return their mobile device. The store representative may launch the DFC 130 on the customer's mobile device 104 and ask them to provide their reasons for returning the device. The customer may speak their reason for returning (feedback): "I'm getting poor audio quality. People tell me they can't hear me. And sometimes people say they sent me a text message but I never get it." (Today, the reasons for a device return are entered by the store representative and are notoriously unreliable.) This feedback can be combined with the customer's device and account information, for example, their home address (so the typical signal strength in their area can be determined), any previous trouble tickets, the software version, and so on. In real time, this data may be combined with information about reports of similar problems with this device and/or in the area. If the reported problems are unique, the store representative would be encouraged to see if there is a specific problem with how and where the customer is using the phone. For example, the customer may need a network extender at home. If the problem is common with the particular device model, there may be a problem that needs to be addressed with the device itself.

Third. The feedback solicitation inquiries may be a survey and the trigger event may be an action performed on the mobile device by the user (e.g., launching an application, selecting a survey button on a screen of the mobile device, speaking the words "feedback" into a microphone of the mobile device, shaking the mobile device, actuating a sequence of buttons on the mobile device, etc.). The trigger event may be publicized and/or may be kept pseudo-confidential (e.g., given out by customer service representatives when deemed appropriate). The trigger event may be an unusual sequence of events ("Easter egg"). The survey may be one or more inquiries that may be aurally and/or visually presented (e.g., a text entry block, a drop down menu, spoken word(s)) to which the user of the mobile device (e.g., customer) may respond (e.g., via voice, text entry, physical movement of device, etc.). When the trigger event occurs, the survey may be presented to the user. The user may be required to submit credentials (e.g., sign in such as to My Verizon Mobile). User information such as MDN, name, etc. may be retrieved by the mobile device and provided with the survey feedback. Feedback may be tagged with GPS information to identify, for example, problem network spots or a particular location. Feedback can be stored in a database for further analysis, trending and designing better products, networks, and services.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A computer configured as a server, for example, includes a data communication interface for packet data communication. The server computer also includes a central processing unit (CPU), in the form of one or more processors, for executing program instructions. The server computer platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar computer platforms, to distribute the processing load.

A computer type user terminal device, such as a PC or tablet computer, similarly includes a data communication interface, processor hardware forming a CPU, main memory and one or more mass storage devices for storing mobile device feedback data and the various executable programs (see FIG. 7). The computer type user terminal device may be configured to implement an administration console 114 (FIG. 1). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of dynamic mobile device feedback set forth above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the MNO into the computer platform of the backend system that will be the feedback server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the remote device diagnostics, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, by a device feedback client residing on a mobile device and from a feedback server, feedback solicitation inquiries and presentation rules;
    identifying, by the device feedback client, a trigger event associated with the mobile device;
    presenting, by the mobile device, the feedback solicitation inquiries in accordance with the presentation rules based on the trigger event;
    receiving, by the device feedback client, a response to the feedback solicitation inquiries from a user of the mobile device;
    transmitting, by the mobile device, the response to the feedback solicitation inquiries to the feedback server, the feedback server identifying an issue associated with the mobile device based on the received response; and receiving, from the feedback server, a proposed solution to the issue,
the proposed solution obtained by posting the issue to a network forum.

2. The method of claim 1, where the feedback solicitation inquiries comprise an invitation and a survey.

3. The method of claim 2,
where presenting the feedback solicitation inquiries includes:
presenting the invitation by the mobile device in accordance with the presentation rules; and
the method further comprising:
receiving an affirmative response based on the presented invitation by the mobile device; and
presenting the survey based on the affirmative response in accordance with the presentation rules.

4. The method of claim 3, where the affirmative response is a verbal affirmative response; and
where the method further comprises:
converting the verbal affirmative response to an electronic response for processing by the device feedback client.

5. The method of claim 1, further comprising:
converting at least one of the feedback solicitation inquiries to speech; and
where presenting the feedback solicitation inquiries includes:
verbally presenting the converted at least one of the feedback solicitation inquiries.

6. The method of claim 1,
where the feedback solicitation inquiries comprise a survey, and
where the method further comprises:
receiving, by the device feedback client, a particular response to the survey from the user of the mobile device; and
recording the particular response.

7. The method of claim 6, further comprising:
transmitting the response to the feedback server.

8. The method of claim 1,
where the trigger event is an action performed on the mobile device by the user, and
where the feedback solicitation inquiries comprise a survey including at least one selection option for selection of a pre-defined feedback statement by the user that is presented based on the performed action.

9. A mobile device, comprising:
a memory component;
a device feedback client stored in the memory component;
a transceiver;
a user interface; and
a processor coupled to the memory component, the transceiver, and the user interface, the processor to:
implement the device feedback client to receive feedback solicitation inquiries and presentation rules via the transceiver from a feedback server,
identify, based on monitoring the mobile device, a trigger event associated with the mobile device,
present, via the user interface and based on identifying the trigger event, the feedback solicitation inquiries in accordance with the presentation rules,
receive, based on presenting the feedback solicitation inquiries, a response to the feedback solicitation inquiries from a user of the mobile device, and transmit the response to the feedback solicitation inquiries to the feedback server,
the feedback server identifying an issue associated with the mobile device based on the received response; and receive, from the feedback server, a proposed solution to the issue,
the proposed solution obtained by posting the issue to a network forum.

10. The mobile device of claim 9, where the feedback solicitation inquiries comprise an invitation and a survey.

11. The mobile device of claim 10, where the processor, when presenting the feedback solicitation inquiries, is to:
present the invitation in accordance with the presentation rules, and
where the processor is further to:
receive an affirmative response based on the presented invitation by the mobile device, and
present the survey based on the affirmative response in accordance with the presentation rules.

12. The mobile device of claim 11, where the affirmative response is a verbal affirmative response, and
where the processor is further to:
convert the verbal affirmative response to an electronic response.

13. The mobile device of claim 9, further comprising:
a speech converter coupled to the processor, the speech converter to convert at least one of the feedback solicitation inquiries to a verbal inquiry; and
a speaker coupled to the speech converter to verbally present the verbal inquiry to the user of the mobile device.

14. The mobile device of claim 9,
where the feedback solicitation inquiries comprise a survey, and
where the processor is further to:
implement the device feedback client to receive a particular response from the user of the mobile device and record the particular response.

15. The mobile device of claim 14,
where the processor, when transmitting the response to the feedback solicitation inquiries, is to:
implement the device feedback client to collect information about the mobile device, and
transmit via the transceiver the particular response and the information about the mobile device to the feedback server.

16. The mobile device of claim 9,
where the trigger event is an action performed on the mobile device by the user, and
where the feedback solicitation inquiries comprise a survey including at least one selection option for selection of a pre-defined feedback statement by the user that is presented based on the performed action.

17. A system, comprising:
a mobile device including a device feedback client to:
communicate with a feedback server,
the feedback server generating feedback solicitation inquiries and presentation rules,
receive the feedback solicitation inquiries and the presentation rules from the feedback server,
identify a trigger event associated with the mobile device,
present the feedback solicitation inquiries, in accordance with the presentation rules based on the trigger event, to a user of the mobile device, receive a response to the feedback solicitation inquiries from the user of the mobile device, transmit the response to the feedback solicitation inquiries to the feedback server;

the feedback server identifying an issue associated with the mobile device based on the received response, and receive, from the feedback server, a proposed solution to the issue, the proposed solution obtained by posting the issue to a network forum.

18. The system of claim 17, where the device feedback client when transmitting the response to the feedback solicitation inquiries, is to:

collect information about the mobile device and transmit the information about the mobile device to the feedback server.

19. The system of claim 18, where the feedback server includes:

other information related to the mobile device collected from at least one source other than the mobile device, the other information integrated with the collected mobile device information.

20. The system of claim 17, where the feedback server, when identifying the issue associated with the mobile device, is to:

identify the issue associated with the mobile device based on parsing the received response of the mobile device, the issue validated by parsing other responses received from other mobile devices and comparing the received response from the mobile device to the other responses received from the other mobile devices.

21. The system of claim 17, where the response to the feedback solicitation inquiries includes mobile device hardware status information, the mobile device hardware status information not being provided by the user.

* * * * *